Dec. 27, 1938.   L. WIMBERGER   2,141,582
CUTTING MACHINE SUCH AS A SAFETY RAZOR
Filed Oct. 29, 1936
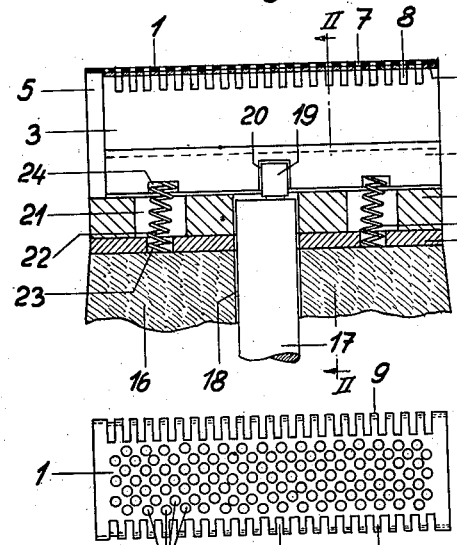
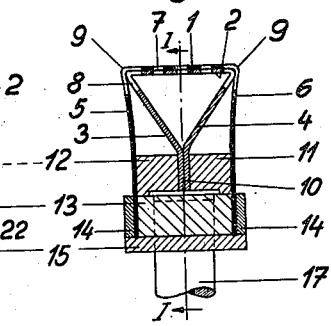
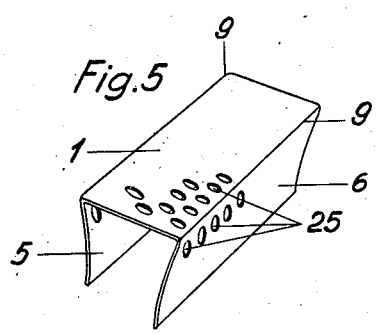
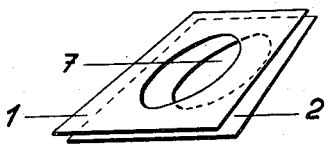
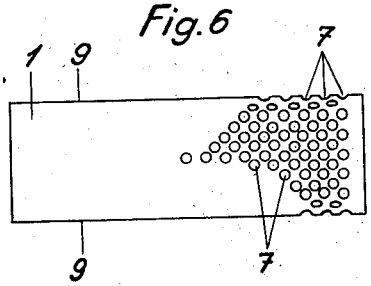
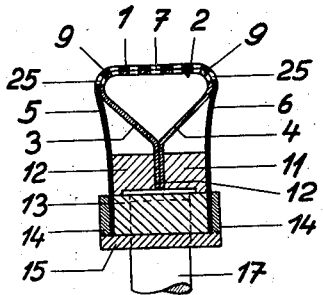
Inventor
Leopold Wimberger
By Bilinger, atty.

Patented Dec. 27, 1938

2,141,582

UNITED STATES PATENT OFFICE 2,141,582

CUTTING MACHINE SUCH AS A SAFETY RAZOR

Leopold Wimberger, Vienna, Austria, assignor to L. Wimberger Kommanditgesellschaft & Co., Patentverwertungsgesellschaft, Vienna, Austria, an Austrian company Application October 29, 1936, Serial No. 108,255
In Austria February 15, 1936

3 Claims. (Cl. 30—43)

This invention is for improvements in or relating to cutting machines such as safety razors. The invention is particularly concerned with cutting machines of the kind having a cutting head which comprises a cutting plate and a cutting knife adapted to be moved relatively to each other and to co-operate to effect a cutting operation, the relative movement between the plate and the knife being effected, generally, by mechanical means or by means of an electromagnetic device such as an electric motor.

One object of the present invention is to provide an improved razor by which a safe and close shave is ensured.

According to the present invention there is provided a cutting machine (e. g. a razor) of the kind in which the cutting head comprises a cutting plate and a cutting knife adapted to be moved relatively to each other and to co-operate to effect a cutting operation, wherein the cutting plate and the cutting knife are provided with a plurality of apertures arranged sieve-fashion to provide a plurality of cutting elements.

From another point of view the present invention provides a cutting machine (e. g. a razor) of the kind in which the cutting head comprises a cutting plate and a cutting knife adapted to be moved relatively to each other and to co-operate to effect a cutting operation, wherein the cutting plate and the cutting knife are provided with a plurality of apertures which receive the article to be cut so that the knife or plate surround the article to be cut and during cutting close in on said article from all sides.

It will be appreciated that in contradistinction to known cutting devices of the safety razor type the present invention is characterized by the fact that the cutting plate and the cutting knife are provided with numerous apertures to provide a plurality of cutting elements. Preferably these cutting elements are of symmetrical form, for example, they may be circular, elliptical, oval, polygonal, or rhombic.

In all cases in contradistinction to devices hitherto known, the invention provides that each hair entering into an opening must immediately after a very small movement of the cutting head come up against a cutting edge, quite apart from the direction in which the cutting head is moved. In this way the risk of missing any of the hairs is quite small if not absent so that even quite short hairs are cut. A very close shave is thus made possible by means of the new construction.

A circular or elliptical shape of the cutting openings is particularly suitable because in the cutting operation the knives, moving relatively to one another, form continually altered pointed angles whereby the cutting openings are converted into two-cornered openings of continually diminishing size. By this means, there is ensured a particularly safe and skin-smooth cutting of the hairs entering into the openings.

The invention will be further described with reference to the accompanying drawing, which shows by way of example embodiments of a safety razor constructed in accordance with the present invention. On the drawing:—

Figure 1 is a longitudinal sectional view on the line I—I of Figure 2 of one embodiment of the cutting head of a safety razor according to the present invention, Figure 2 is a cross section on the line II—II of Figure 1, Figure 3 is a plan view of the embodiment shown in Figure 1, Figure 4 is a diagrammatic view on an enlarged scale showing the principle on which the razor operates, Figure 5 is a perspective view of a modified construction of a cutting plate according to the invention and Figures 6 and 7 are plan and cross section respectively of a further embodiment of the invention.

In the construction according to Figures 1 to 3 the cutting apertures or openings 7 in the centre part of the cutting plate 1 and in the cutting knife 2 are of circular shape, and they are preferably arranged in staggered relationship to each other. The side parts 5, 6 of the cutting plate 1 are bent so as to give the plate a U-like shape. In order to extend the application of the shear or cutting head to the cutting of longer hairs, the longitudinal edges 9 of the knife in this example, and of the cutting plate 1 are provided with transverse tooth-like slots 8. These work as preliminary cutters while the fine cutting of the bristles formed by the preliminary cutter is effected by the cutting apertures 7.

In addition to the advantages already mentioned, further advantages are gained by the arrangement of a large number of the cutting openings 7 in accordance with the invention. For example, the bristles standing at a slant to the surface of the skin, which, in the case of the long slots hitherto customary could relatively easily miss being cut, are simultaneously caught up in many places on the surface of the skin so that each single bristle is surrounded by a cutter with very little slant. Quicker operation is thereby made possible. In contradistinction to the long slots, the construction of the knife portion according to the invention causes a much greater resistance to bending when the cutting plate and also the cutting knife are pressed on to the skin. It is therefore possible to make the parts 1 and 2 thinner than was hitherto possible. In this way the danger of wounding the skin is avoided by the employment of very thin sheet because the openings 7 are surrounded on all sides by much greater surfaces for the skin than in the case of the small intermediate spaces of the parallel blades hitherto customary, so that the entrance of the skin in the cutting openings does not go beyond what is necessary. This will be clearly seen from the enlarged representation of two circular shaped cutting openings 7 lying one on top of the other (Fig. 4). It will also be seen from this figure, which shows the co-operating openings 7 of the cutting plate 1 and the cutting knife 2 moved relatively to each other, how by the cutting edges crossing one another during the cutting operation, the two-cornered opening is formed and becomes smaller and smaller.

Finally the preparation of the plates 1 and 2 from quite thin material is made possible and simpler in accordance with the invention than with the long narrow slits. In order to obtain the necessary stiffness of the knife members which consist of very thin sheet and to bring about the considerable reduction of the surface friction necessary for this construction, the side parts 3 and 4 of the knife members are bent together to a triangular form and the ends 10 of the strips are stretched between sliding pieces 11 and 12. The sides 5 and 6 of the cutting plate 1 are bent U-fashion, and, in a manner known in principle, are fixed to the base plate 13, for example, by means of small bands 14. Between the base plate 13 and the member 16 holding the moving or knife operating device there is inserted a small plate 15. The moving or operating shaft 17 for the knife 2 is mounted in an aperture in the member 16 and carries the crank pin 19 which slides in a groove 20 passing across the sliding pieces 11 and 12. In order to attain the necessary pressure of the knife on the skin, pressure springs 22 are provided which are set in recesses 23 and 24 in the plate 15 and the sliding pieces 11 and 12, and pass through the large perforations 21 in the base plate 13. The springs lie firmly both in the plate 15 and also in the sliding pieces 11 and 12, so that with the quick to and from movement of the knife sliding friction is reduced by the springs. In Figures 5 to 7 are shown two constructions in which in place of the preliminary cutting slots 8, peripherally closed openings 25 are provided along the edge 9 and conveniently also in the side parts 5 and 6. In the construction according to Figure 5 sharp bends are shown at the edge 9, whereas Figures 6 and 7 show a construction having a rounded longitudinal edge both for the cutting plate 1 and also the cutting knife 2.

It is to be understood that modifications may be made in the examples above set forth without departing from the nature of the invention.

Having now particularly described and ascertained the nature of my said invention, and in what manner the same is to be performed, I declare that what I claim is:—

1. In a hair cutting machine especially a safety razor of the character described, a handle member, an operating shaft in said member, a shearing head mounted on said handle and including a stationary cutting plate of very small thickness and a cutting knife plate, means to move said knife plate in a plane parallel to that of stationary plate, said plates each having numerous small cutting apertures whose dimensions are substantially equal in all directions.

2. In a hair cutting machine especially a safety razor of the character described, a shearing head including a cutting plate and a cutting knife adapted to be moved relatively to each other in parallel planes, said cutting plate and said cutting knife each having numerous small apertures, the apertures of the plate and the apertures of the knife registering with one another to provide spaces to receive the hair to be cut and the peripheral edges of which cooperate to shear the hair, said apertures being of a configuration and being arranged so that the cooperating shearing edges at said apertures are non-parallel over substantially the whole length of said edges in virtue of which the cooperating edges hve a scissors-like cutting action.

3. In a hair cutting machine especially a safety razor of the character described, a shearing head including a cutting plate and a cutting knife plate adapted to be moved relatively to each other in parallel planes, said cutting plate and said cutting knife plate each having numerous small cutting apertures whose dimensions are substantially equal in all directions, said plates at their respective meeting longitudinal edges with their respective side members having registerable openings e. g. short slots also providing cutting edges.

LEOPOLD WIMBERGER.